INVENTOR.
WILLIAM B. ZELINA
BY Vernon F. Kalb
ATTORNEY

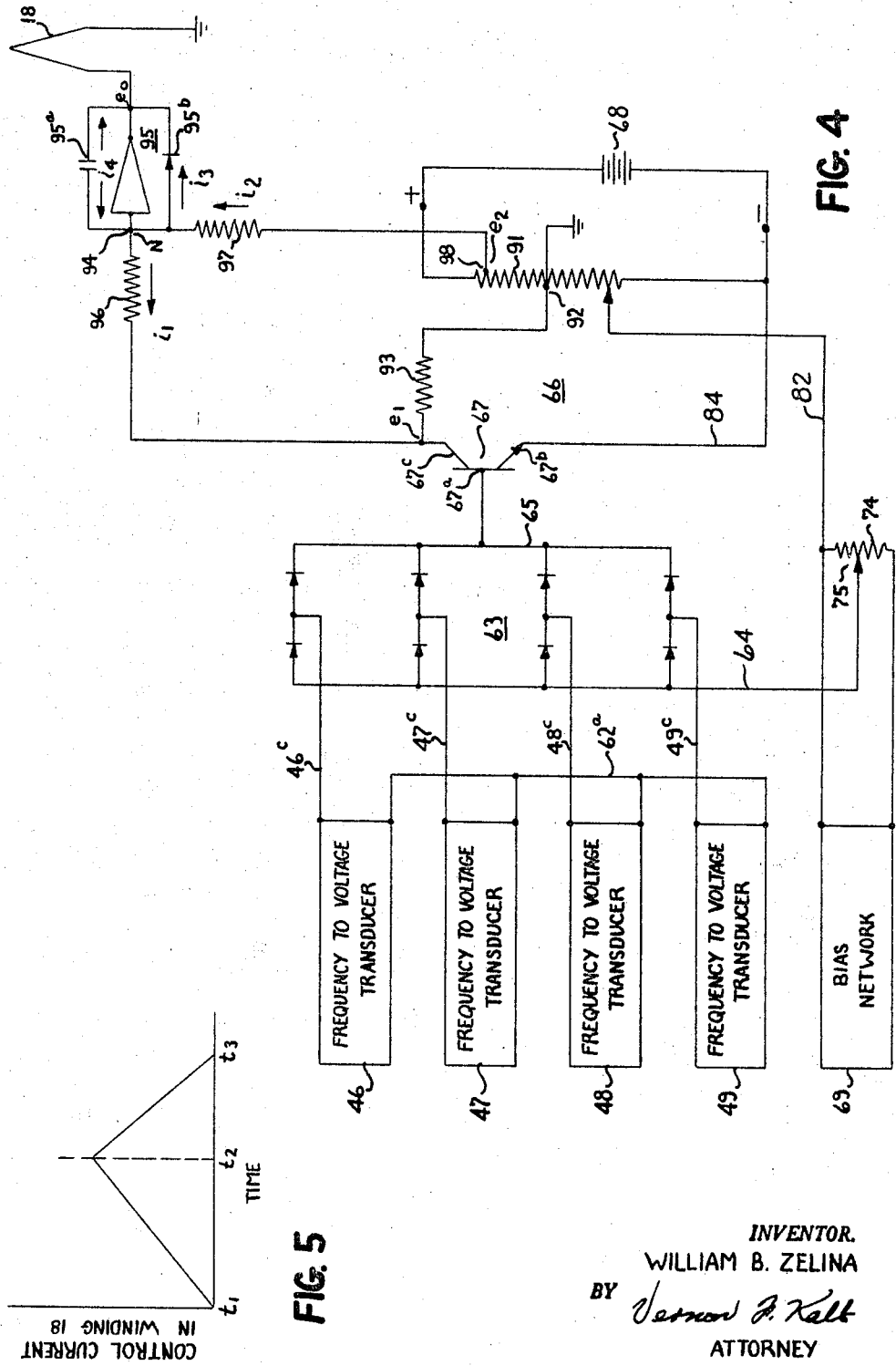

United States Patent Office 3,210,630
Patented Oct. 5, 1965

3,210,630
PLURAL MOTOR DRIVE WITH DIFFERENTIAL AND SYNCHRONOUS SLIP CONTROL
William B. Zelina, Erie, Pa., assignor to General Electric Company, a corporation of New York
Filed Mar. 15, 1963, Ser. No. 266,466
11 Claims. (Cl. 318—52)

This invention relates to control systems for electrically propelled vehicles, and more particularly relates to detection and control of loss of adhesion of electrically powered vehicle wheels.

This is a continuation-in-part of my copending application Serial No. 20,755 filed April 7, 1960, now abandoned.

The problem of loss of adhesion between locomotive wheels and rails as old as railroading itself. However, developments in the past thirty years have given this problem new significance. Loss of adhesion, or otherwise stated, decrease in the coefficient of friction between wheel and rail below that required to maintain a powered wheel in rolling contact with the rail, will result in slipping or sliding of the wheel on the rail. In a steam locomotive the engineman could audibly detect wheel slippage and notice the accompanying loss of tractive power. Experience taught the engineman to take the necessary corrective action. The advent of the diesel-electric locomotive has changed this situation. When one, or all, of the individually powered axles of a diesel-electric locomotive slips, there is often neither sufficient sound nor notice of loss of tractive effort to warn the engineman. Uncorrected wheel slips can cause severe damage to locomotive equipment and track. Therefore, some automatic means of detecting and correcting wheels slip on electrically-driven locomotives is highly important.

Extensive studies have been made on the problem of adhesion between a locomotive drive wheel and rail. Robert K. Allen has shed considerable light on the basic mechanism of wheel slipping by demonstrating the existence of a very thin invisible moisture-propagated oil film on the running surface of a rail. Mr. Allen's work has shown that this oil film can reduce adhesion values to as low as 10% even with contact pressures of 75,000 p.s.i. between the wheel and rail. Mr. Allen's findings are summarized in Patent 2,890,970 assigned to the same assignee as this application.

An aspect of the wheel slip problem that is poorly understood at the present time is high speed slip. Prolonged slipping has been recorded at high speeds with adhesion as low as 5%. Under these conditions the slip speed appears to depend on the dynamics of the locomotive, the construction of the roadbed, and the condition of the rail, and therefore, is for the most part unpredictable. The phenomenon of weight shifting is also associated with wheel slip, particularly in starting heavy trains and in "drag" type freight service. When weight shifting on the axle occurs, the wheels having the lighter contact pressure on the rail have a tendency to slip with respect to the wheels of the heavier loaded axle. In addition conditions often arise where all wheels slip at the same speed. The consequences of undetected wheel slip include severe rail damage from slips at low speed, motor and generator flashovers, and mechanical damage to traction motor armatures and gears from slips at high speeds.

A related problem to wheel slip is wheel slide, which may occur during dynamic braking of an electrically-powered locomotive when the braking torque of the motor becomes excessive for the degree of adhesion between wheel and rail. The problems are similar in the respect that both occur when the torque of the motors driven by the axles as generators is excessive for the adhesion between wheel and rail. Sliding wheels will develop flat spots, and if the sliding condition is allowed to persist, derailment may result.

A lengthy study conducted by the New York Central Railroad has shown that sustained slips up to 150% of the locomotive speed, wher the locomotive was geared for a 98 miles per hour maximum speed, are often encountered. In numerous instances the peripheral velocities of the slipping wheels were equivalent to a locomotive speed in excess of 120 miles per hour when the locomotive was operating at speeds between 60 and 70 miles per hour. Continuous slips at these speeds occurred for distances as great as 34 miles measured on the tread of the slipping wheel. This study has shown that conventional wheel slip relays comparing traction motor voltages and/or currents do not afford adequate protection over the entire locomotive speed operating range, particularly at high speeds when the motor fields are shunted.

To adequately cover the entire speed range, an adhesion loss control system must have controlled sensitivity in order to give proper protection at both low and high locomotive speeds, and have a sufficiently rapid response to correct wheel slips and slides before damage is done to the locomotive or rail. In addition, it is often desirable to be able to detect a rotational wheel speed which exceeds a predetermined maximum value. Furthermore, the system should be insensitive to differences in wheel speeds due to wheels of unequal diameter. In the interests of economy and reliability, the components of the system should be sturdy, easily accessible, and require little if any maintenance, otherwise locomotive availability, reliability and performance may be impaired.

Systems for detecting load unbalance between a pair of traction motors have several disadvantages. The control systems operating on unbalance in traction motor current decrease in sensitivity as the speed increases, since in a traction motor the current is an inverse function of speed. A further disadvantage of this type of system is that when a motor is inoperative and removed from the circuit, the wheel slip protection on the other motor of the pair is lost and the system will give no indication of a locked axle. When differential armature voltage between a pair of traction motors is utilized to indicate wheel slip, the opposite characteristics of the current indication system are realized since the motor voltages are relatively low at low speed. When the locomotive motor connections are changed from series-parallel to parallel and the motor fields shunted as the speed is increased, all motors are in parallel and therefore no voltage differentials between motors or motor fields are readily obtainable, rendering this type of system useless at high speeds where the voltage-sensitive relays would normally have greatest sensitivity.

Wheel adhesion loss detection systems utilizing axle-driven generators or alternators to indicate differences in axle speeds have been proposed in the past. However, the majority of these systems still compare the speeds between two of the axles and actuate some warning device or sanding system whenever a predetermined speed differential exists between the compared axles. These types of systems heretofore required means to detect the differences in speed between each pair of axles and further utilized separate detecting and indicating means for wheel slip and wheel slide. Patent 2,652,555 discloses a wheel slip detection circuit wherein the speed of each axle is compared with the speed of all of the axles. This detection circuit is simple and economical in structure and sensitive in operation, and I therefore prefer to make use of such a detection circuit in practicing the present invention.

Moreover, when the known systems are utilized to reduce generator excitation, and therefore motor current and torque, upon detection of a wheel slip or wheel slide the systems are so arranged as to reduce generator excitation in steps by inserting resistance in the generator field, or by completely reducing the power output of the generator. This results in undesired prolonged interruption in power supplied to the motors with a corresponding undesired prolonged interruption in the motor driving or braking torque and acceleration or deceleration of the locomotive and appending train. Furthermore, if the generator field is re-excited to the original value at which wheel slipping or sliding occurred, there is usually a recurrence of wheel slipping or sliding unless the engineman reduces the power input to the generator. At least one system has been proposed which utilizes a powered rheostat to insert resistance into the generator excitation system when loss of adhesion occurs between a pair of axles until the slippage ceases. The rheostat is then placed under the control of the prime mover governor to raise the level of excitation of the generator. Although this type of system smoothly reapplies generator excitation, it is fundamentally slower in response than the systems which control generator excitation in steps, due to the use of mechanical or hydraulic mechanisms.

In view of the aforementioned limitations and deficiencies of wheel slip-slide detection and correction systems, it is a primary object of this invention to provide a new and improved adhesion loss detection and correction control system which avoids one or more of the disadvantages of the prior-art systems and which automatically detects and corrects wheel slipping and/or sliding of locomotive wheels throughout the speed range of the locomotive.

It is another object of this invention to provide a wheel adhesion loss detection and correction system which will automatically and continuously control and regulate the excitation of the generator supplying electrical energy to the traction motors upon occurrence of wheel slipping and/or sliding with minimum response time in effecting such detection and correction.

It is a further object of this invention to provide such a wheel adhesion loss detection and correction system which is not sensitive to slip or slide speed differentials between axles below a value predetermined by the allowable variance in wheel diameters and the speed of the rail vehicle.

It is a still further object of this invention to provide a system meeting the aforementioned objects which is economical, easily accessible and reliable.

Briefly stated, in accordance with one aspect of my invention a wheel adhesion loss detection and correction system is provided comprising means associated with each powered axle for deriving a unidirectional signal proportional to the speed of the axles and meals for comparing the magnitudes of the axle speed indicative signals. If any of the axle speed indicative signals varies from the others by an amount predetermined by the allowable variation in wheel diameters and the locomotive speed, such variance is detected and utilized to light a warning light, actuate a wheel slip relay, actuate a sanding system and/or initiate a sequence of events to automatically correct the wheel slip or wheel slide. Means are also provided to predetermine the allowable differential in axle speed for variance in wheel diameter and locomotive speed.

In further accord with this invention the system may be provided with additional means for detecting the condition when all wheels exceed a predetermined maximum rotational speed. This condition may manifest itself as "synchronous slip," when all wheels are slipping at the same speed in excess of the predetermined maximum value, or as "overspeed" when, even though no slip may be present, the vehicle speed is such that all wheels attain a speed exceeding the predetermined maximum value.

The novel features believed characteristic of this invention are set forth with particularity in the appended claims. The invention itself, however, both as to its organization and method of operation, together with further objects and advantages thereof, can best be understood by referring to the following description when taken in connection with the following drawings wherein:

FIG. 4 illustrates a schematic circuit diagram of a possible modification to the embodiment of my invention shown in FIG. 1;

FIG. 5 is a graphic illustration to aid in the description of the operation of FIG. 4;

Figure 1:
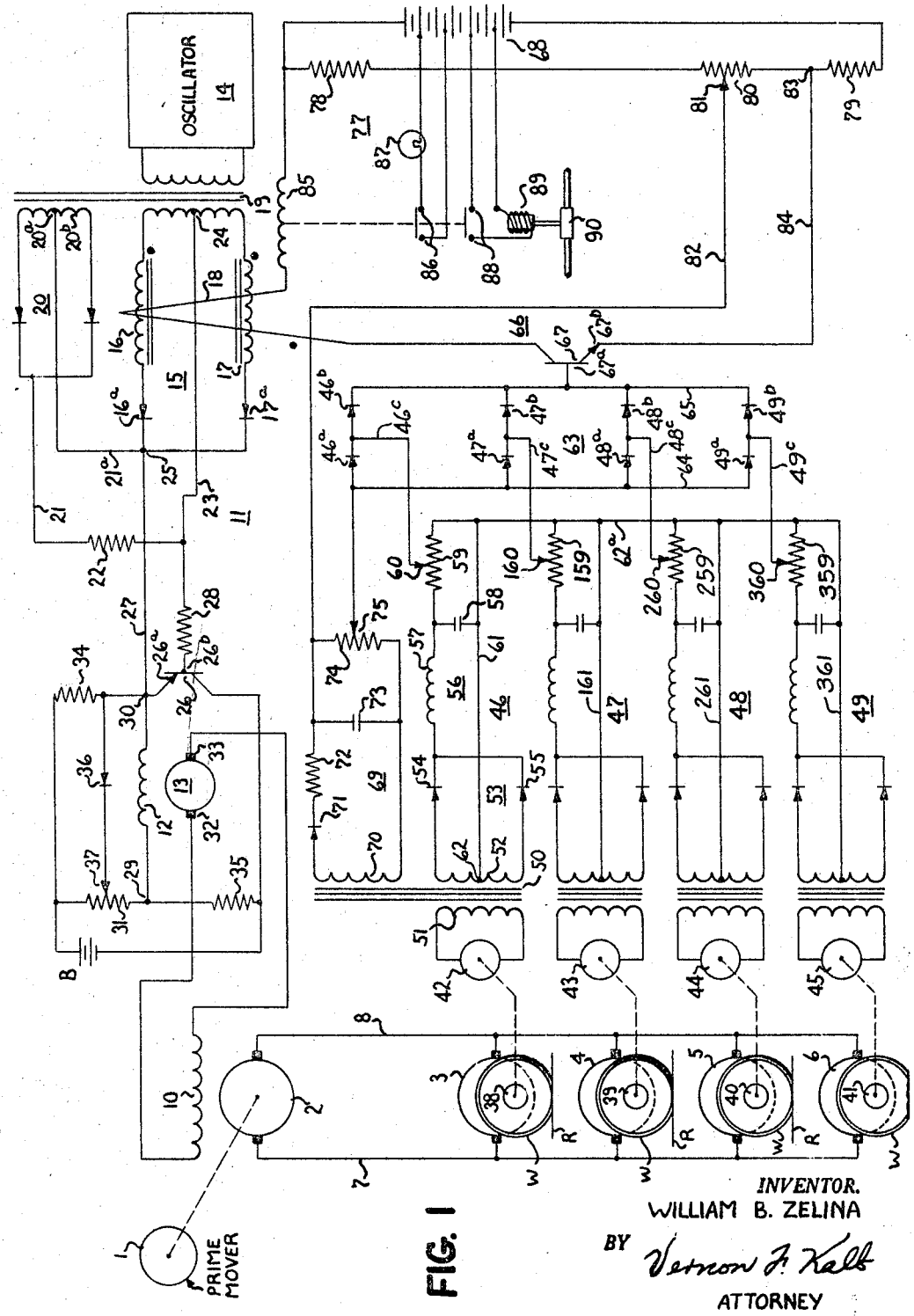
FIG. 1 illustrates a schematic circuit diagram of an embodiment of an adhesion loss detection and control system constructed in accordance with the present invention.

Reference is now made to FIG. 1 where I show a prime mover 1 which may be a diesel engine or gas turbine, adapted to drive a traction generator 2 which applies electrical energy to a plurality of traction motors 3, 4, 5 and 6. In the illustration the traction motors 3, 4, 5 and 6 are all connected in parallel to the generator between lines 7 and 8. This is the usual arrangement for higher locomotive speeds. The field 10 of generator 2 is excited by an excitation system preferably of a type including switching amplifier 11 which excites and controls the excitation of field 12 of exciter generator 13. Exciter generator 13 furnishes electrical energy to the field 10 of traction generator 2 to supply excitation therefor.

This preferred excitation system is disclosed and claimed in my previously issued Patent 2,886,763 assigned to the same assignee as the present application. Briefly stated, the excitation system comprises the features and functions as follows: A rectangular wave oscillator 14 is transformer coupled to a self-saturating magnetic amplifier 15 which comprises load windings 16 and 17 with associated rectifying elements 16a and 17a and a control winding 18 thereon. Exciting current for the magnetic amplifier is derived from full wave rectifier 20 coupled to the oscillator 14 by means of transformer 19. The exciting current path is over line 21 from rectifier 20, through resistor 22 over line 23 to the center tap 24 on the secondary of transformer 19, through the load windings 16 and 17 and associated rectifiers 16a and 17a, to output terminal 25 of amplifier 15, and over line 21a to the center tap 20a of winding 20b. The rectified rectangular half cycle output of oscillator 14 will appear as a unidirectional signal at output terminal 25 of magnetic amplifier 15 if no volt-seconds of the oscillator output is required to saturate the amplifier 15. Therefore, by regulating the current through winding 18, the output may be controlled between the limits of a unidirectional signal, through pulses of decreasing width or time duration to zero. In the arrangement illustrated, increasing current through winding 18 decreases the width of the output pulses appearing at output terminal 25. Output terminal 25 is connected to an electrode of a switching device, preferably a transistor 26 through line 27, the connection being to the emitter 26a of transistor 26. The base 26b of transistor 26 is biased positive with respect to the emitter 26a by the output of rectifier 20 across resistor 28. The transistor may therefore be switched off and on by the output of magnetic amplifier 15, the on time varying in accordance with the current in control winding 18. It is to be understood that other control windings may be utilized on magnetic amplifier 15 to control its output in accordance with operating characteristics of the motors and generator. However, for clarity of illustration and description of the present invention, other control windings are not here shown. For a more detailed description of the structure and operation of the switching amplifier 11, reference is made to the aforementioned Patent 2,866,763.

The excitation of exciter generator 13 is determined by the conductive condition of transistor 26. When transistor 26 is ON, current flows in field winding 12 from point 29 to point 30 from source B through the path defined by resistor 31, field winding 12, the transistor emitter-collector circuit and back to the negative terminal of source B. When the transistor 26 is OFF, provision is made to pass a current through field winding coil 12 to overcome the effect of residual magnetism of the exciter generator field which would tend to produce an output across the terminals 32 and 33 of the exciter generator 13. The exciter field demagnetizing current flows through field winding 12 from point 30 to point 29 through resistor 34, field winding 12, resistor 35 and back to source B. A commutating rectifier 36 is connected across the field winding 12 from point 30 to tap 37 on resistor 31 to discharge field winding 12 when transistor 26 is turned off.

Figure 2:
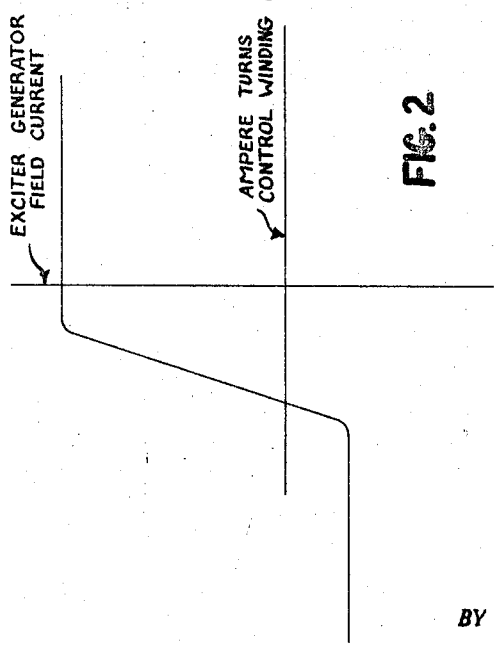
FIG. 2 illustrates a characteristic of the excitation control arrangement illustrated in FIG. 1.

When transistor 26 is ON, the steady state value of current through field winding 12 from point 29 to point 30 is determined by the series value of resistor 31 and the resistance of field winding 12, and the shunting effect of resistors 34 and 35. When the transistor 26 is OFF, the steady state value of the demagnetizing current flow through field winding 12 from point 30 to point 29 is determined by the resistance 34 and the value of resistance between tap 37 on resistor 31 and point 29. As would well be expected, the demagnetizing current flow through field winding 12 is substantially less than the maximum exciting current flow therethrough. The relationship of exciter generator field current and ampere turns of control winding 18 of magnetic amplifier 15 is graphically illustrated in FIG. 2.

The output terminals of the exciter generator 13 are connected across the field winding 10 of generator 2 and supply generator excitation thereto. The level of excitation of the generator, of course, determines the power output of the generator and hence the power input to and torque of the motors 3, 4, 5 and 6. The traction motors 3, 4, 5 and 6 are driveably connected through conventional pinion and gear arrangements, not shown, to axles 38, 39, 40 and 41 having wheels W mounted thereon. The wheels W contact rail R. The wheels and axles may be mounted in a conventional truck assembly which supports the locomotive body on the rail R. For simplicity of illustration, the axles and respective motors are shown in schematic association. Driveably connected to the axles 38, 39, 40 and 41 are generators 42, 43, 44 and 45 respectively. The generators are preferably alternators yielding a signal whose frequency is proportional to the speed of revolution of the driving axle and preferably of the type disclosed and claimed in my copending application, Serial No. 20,767, filed on the same date as this application and assigned to the same assignee as this application, now U.S. Patent No. 3,077,549. Reference is made to this patent for the details of construction of the alternator.

The output of each of the alternators 42, 43, 44 and 45 is applied to frequency-to-voltage transducers 46, 47, 48 and 49 respectively. Inasmuch as the transducers are identical with respect to number and arrangement of elements, only transducer 46 will be described in detail. Each of these transducers 46, 47, 48 and 49 comprises a saturating transformer 50 having a rectangular hysteresis characteristic and primary and secondary windings 51 and 52. A full wave rectifier 53 comprising diodes 54 and 55 is connected to the secondary winding 52 of transformer 50. The output of the full wave rectifier 53 is applied to a filter 56 comprising an inductance 57 and capacitance 58, and the output of the filter is applied across potentiometer 59 having a variable tap 60. The circuit is completed through line 61 from potentiometer 59 to the center tap 62 of transformer 50. The center taps 62 of all the transformers 50 are commonly connected through line 62a to provide a common current return for the sources of potential. The frequency-to-voltage transducers provide a direct current output voltage which is proportional to the frequency of the alternator, which in turn is proportional to its driven speed, and hence to the speed of rotation of the associated axles.

The secondary voltage of a transformer is defined as $$e = N\frac{d\phi}{dt}$$

from which it may be shown that $$\phi = \frac{1}{N}\int_{t_2}^{t_1} e\,dt \text{ and } \Delta\phi\frac{1}{N} \text{ (volt-seconds)}$$

The transducer transformer 50 is designed to operate between positive and negative saturation of its rectangular hysteresis characteristic core, so that $\Delta\phi$ is constant. Thus, it delivers a constant volt-second output for each half cycle. By rectifying and filtering its output, a direct current voltage is obtained that is proportional to the frequency of the input signal to primary winding 51 from the axle-driven alternator. Inasmuch as there may be a slight variance in the physical characteristics of the magnetic core of each transformer, the transducers may be balanced by means of variable taps 60, 160, 260 and 360 on potentiometers 59, 159, 259 and 359 respectively.

The output of each of the transducers is applied to a voltage comparison circuit 63 comprising a parallel arrangement of series diode pairs 46a, 46b; 47a, 47b; 48a, 48b; and 49a, 49b connected between common lines 64 and 65. This comparison circuit which I prefer to utilize is disclosed and claimed in Patent 2,652,555 issued to Russell M. Smith and assigned to the same assignee as the present application. The output of each transducer is applied to the common connection between its associated series diode pair. If the voltage corresponding to the speed of any one axle is higher than the others, or if any voltage unbalance occurs in the comparison circuit 63, the difference in voltage corresponding to the slip speed will appear across the comparison circuit. The comparison circuit is connected to a detector circuit 66 which comprises an amplifier, preferably a transistor 67 in series-circuit relation with control winding 18 and a source of electrical potential which may be the locomotive battery 68. When current flows in this circuit, the ampere turns of control winding 18 increase in the negative direction to drive the cores of magnetic amplifier 15 toward negative saturation and decrease the excitation of generator 2. Means are provided for deriving a locomotive speed bias signal and wheel diameter differential bias signal. These reference signals may be derived from another alternator-transducer arrangement associated with an idler axle if there is an idler axle under the locomotive or mounted on the opposite end of one of the axles to the end upon which one of the transducers 46, 47, 48 or 49 is mounted. However, in the interest of simplicity and economy, I prefer to utilize a speed bias reference network 69 which comprises an additional secondary winding 70 on one of the transformers, a rectifying element 71, and a filter comprising resistance 72 and capacitance 73. The output of the transducer is applied across a potentiometer 74 having a variable tap 75 thereon.

A voltage divider network 77 comprising resistors 78 and 79 and potentiometer 80 having a variable tap 81 thereon is connected across the voltage source 68. The output of the transducer 69 is connected to variable tap 81 of potentiometer 80 through line 82. The variable tap 75 of potentiometer 74 is connected to the negative line 64 of detector circuit 63.

Figure 3:
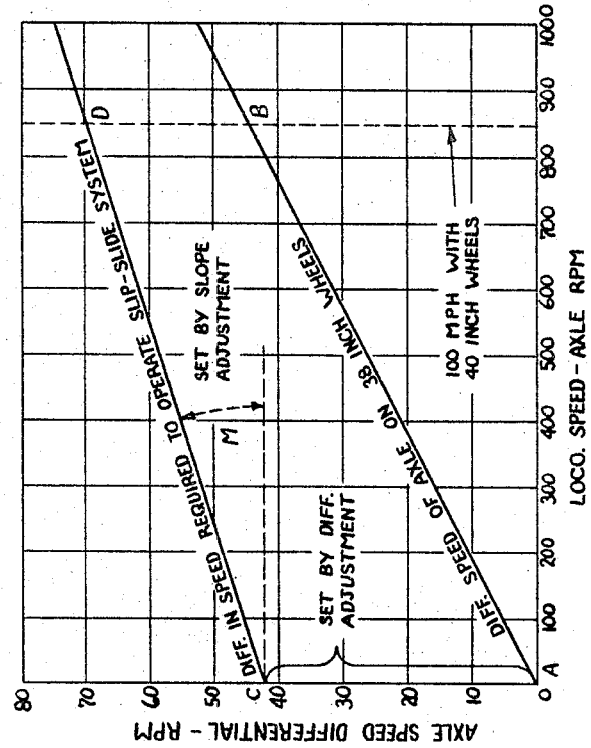
FIG. 3 is graphically illustrative of differential requirements of a comprehensive wheel adhesive loss detection system.

Reference is now made to FIG. 3 which illustrates the differential requirements of an acceptable wheel slip-slide detection system. To avoid false wheel slip indications, the system must allow for differences in wheel diameters on a given locomotive unit. At the present time the allowable wear on locomotive wheels is 5% or 2 inches on a 40-inch wheel. This means that the slip differential to which the system responds must increase with locomotive speed. By way of example, line AB of FIG. 3 shows the possible speed differentials that would occur on a locomotive with nominal 40-inch diameter driving wheels if the maximum allowable (5%) variation in wheel diameter exists. System operation upon a slip of less than the axle speed for the related speed defined by line AB would give a false indication.

The maximum slip differential that can be tolerated without danger of damage to locomotive equipment also varies with locomotive speed. Experience has demonstrated that at standstill (0 m.p.h.) a maximum slip of 5 miles per hour should be detected in order to prevent rail damage. This value is represented by point C in FIG. 3. At maximum locomotive speed the traction motors should not be subjected to more than 10% overspeed. This is indicated by point D in FIG. 3. The line CD therefore indicates one system performance designed to prevent damage from wheel slip or slide.

The system described in FIG. 1 is capable of being readily adjusted to meet these criteria for any particular set of operating conditions. The axle speed differential required to operate the detector 66 is set by means of tap 81 of potentiometer 80. The slope M of line CD is adjusted to obtain the required slip differential at maximum locomotive speed by means of tap 75 on potentiometer 74.

The input circuit and the base-emitter bias circuit of transistor 67, the speed bias reference provided by circuit 69, the sources of slip signals, and the return circuits therefor, may be traced as follows:

Under normal operating conditions wherein there is no slip or slide present, axles 38, 39, 40 and 41 have the same speed of rotation. The frequencies of alternators 42, 43, 44 and 45 associated with these axles, therefore, are also equal. Further, since the output of circuits 46, 47, 48 and 49 is proportional to alternator frequency, the variable taps 60, 160, 260 and 360 of potentiometers 59, 159, 259 and 359 respectively are adjusted to compensate for slight variations in the physical characteristics of each magnetic core so that, for such a no slip or slide condition, the potentials of the taps 60, 160, 260 and 360 with respect to the common conductor 62a are equal.

Assume now that axle 39 slips. This results in the frequency of alternator 43 being higher than that of alternators 42, 44 and 45 and consequently, since the output of the transducer circuits is proportional to alternator frequency, results in the potential of the tap 160 being higher than the potential of the taps 60, 260 and 360.

When the potential of the tap 160, with respect to common conductor 62a, reaches a predetermined level, set by the potential drop between variable tap 81 and the point 83 and between the conductor 82 and variable tap 75, current appears at the base 67a of transistor 67.

The current appearing at base 67a flows from transducer circuit 47 and through variable tap 160, conductor 47c, and diode 47b. Current leaves emitter 67b of transistor 67, through conductor 84 and, through potentiometer 80 and variable tap 81 thereof, to the conductor 82. The current flows through conductor 82, potentiometer 74, and variable tap 75 thereof, to conductor 64 and from conductor 64 through parallel circuits to conductor 62a. The current returns to the source from conductor 62a through the conductor 161.

The parallel circuit associated with transducer circuit 46 is from conductor 64 through diode 46a, conductor 46c and into variable tap 60 of potentiometer 59 to conductor 62a. Similarly, the parallel circuit associated with transducer circuit 48 includes diode 48a and potentiometer 259, while the parallel circuit associated with transducer circuit 49 includes diode 49a and potentiometer 359. Thus, with one axle slipping the number of parallel return circuits is one less than the total number of axles in the system that are equipped with alternators, and transducer circuits.

Assume now that axle 39 slides. This results in alternator 43 having a frequency which is lower than that of alternators 42, 44 and 45. Under these conditions, the potential of the tap 160 with respect to the common conductor 62a is less than the potential at taps 60, 260 and 360. When this potential reaches a predetermined level, current appears at the base 67a of transistor 67. This current originates from the parallel output of the transducer circuits associated with the non-sliding axles.

For example, current leaves transducer circuit 46 through variable tap 60 of potentiometer 59 and through diode 46b to conductor 65. Current also leaves transducer circuit 48 through variable tap 260 of potentiometer 259, then through diode 48b to conductor 65. Current also leaves transducer circuit 49 though variable tap 360 of potentiometer 359, then through diode 49b to conductor 65. Thus, with one axle sliding (or three axles slipping at the same speed) the number of parallel sources is one less than the total number of axles in the system that are equipped with alternators and transducer circuits.

From conductor 65, the net current from the circuits with the higher potential flows to the base 67a, out emitter 67b and over conductor 84 to connection 83 to potentiometer 80. The current flows out variable tap 81 of potentiometer 80 and over conductor 82 to potentiometer 74, then out variable tap 75 thereof through conductor 64, diode 47a and into variable tap 60 of potentiometer 159 to conductor 62a. From conductor 62a the currents divide again and return to their original transducer sources through conductors 61, 261 and 361.

In the foregoing described conditions, the current path is through potentiometers 80 and 74. The potential drop across potentiometer 80 is set by variable tap 81 and is in series aiding with the difference in potential between variable taps 60, 160, 260 and 360 that exists when a wheel slip or slide occurs. This same potential drop sets the level of potential difference between the axle circuits which is required to have a current appear in base 67a of transistor 67 when the potential between conductors 82 and 64 is zero. The potential between conductors 82 and 64 is zero, for example, when axle 38 is at standstill.

The speed bias reference circuit supplies a potential between conductors 82 and 64 which is proportional to the frequency of alternator 42. The proportionality constant depends on the setting of tap 75. The potential supplied by this circuit is in series opposition with the difference in potential between variable taps 60, 160, 260 and 360. Therefore, as the speed of axle 38 increases and the output potential of this speed bias circuit increases, the net potential that is available to aid a potential difference between transducer circuits 46, 47, 48 and 49, due to a wheel slip or slide, decreases. This produces the desirable result that the system is less sensitive as the speed of the locomotive increases.

A base-emitter current will flow in the circuit previously traced and a current proportional to the voltage on the base above the differential speed bias will flow from source 68 through relay coil 85, control winding 18 and the collector-emitter ciruit of transistors 67. The current through control winding 18 drives the cores of magnetic amplifier 15 toward negative saturation and decreases the pulse duration of the pulse output of the magnetic amplifier 15, which in turn decreases the excitation of exciter generator 13 and generator 2, and hence the torque of the motors. It should be pointed out that the repetition rate of the oscillator may be 600 cycles or more per second while the inductance over resistance time constant of the exciter field winding 12 is on the order of one second or more. Therefore, the inductance of field winding 12 acts as a filter to smooth the pulsed energy input to the field and very little ripple is noticed in the current through field winding 12. The decrease in motor torque depends on the conductivity of transistor 67 which in turn depends on the magnitude of the signal applied to base 67a and therefore the severity of the wheel slip. As the power supplied to the motor driving the slipping wheels is decreased, the severity of the slip is decreased, the differential axle speed signal on the base 67a decreases, decreasing the conductivity of transistor 67 and the current through winding 18, to raise the level of excitation of the generator and increase motor torque.

When current flows through relay coil 85, contacts 86 connected across a portion of potential source 68 will be closed and a warning light 87, preferably located before the engineman, will be lit to indicate a loss of adhesion. Energization of the relay coil 85 will also close contacts 88 connected across a portion of voltage source 68 which will energize the coil 89, activating a valve 90 in a locomotive sanding system to apply sand to the rail where a wheel is slipping or sliding. The purpose of the warning light is to alert the engineman in case an adhesion loss indication should persist, inasmuch as the indication may be due to a locked axle. The actuation of a sanding system is considered optional, although it is preferable and demanded by some railroads.

Let us now consider operation of the adhesion loss system of FIG. 1 when wheels of an axle slip, specifically the wheels on axle 38, whose alternator 42 supplies both a slip signal and speed reference bias. Operation of the system upon sliding will be discussed in conjunction with FIG. 6. Assume that the locomotive is pulling a train. The wheels W mounted on axle 38 commence to slip on rail R and the speed of axle 38 with respect to the other axles exceeds the allowable differential for the given locomotive speed. The speed of alternator 42 is increased and inasmuch as the biasing network 69 is coupled to the output of alternator 42, the bias on emitter 67b will go more positive. However, the unidirectional output of transducer 46 increases due to the increased speed of alternator 42, and there is a resulting unbalance of voltage in comparison circuit 63 and the base 67a of transistor 67 goes sufficiently positive with respect to emitter 67b to render the transistor conductive. The negative ampere turns of control winding 18 then increase as current flows into collector-emitter circuit of transistor 67, thereby decreasing the excitation of traction generator 2 and the torque applied to the motors 3, 4, 5 and 6. As the torque of motor 3 decreases, the slip of the wheels on axle 38 decreases, and the driven speed of alternator 42 decreases, thereby decreasing the unidirectional voltage outputs of transducer 46 and speed biasing network 69, which in turn reduces the conductivity of transistor 67. As the conductivity of transistor 67 decreases, the excitation of generator 2 increases, increasing traction motor torque. At the same time, the wheel slip indicating light 87 is lit to alert the engineman and valve 90 is actuated to apply sand on the rail before the wheels. The above-described regulating action of the adhesion loss control system will continue in either direction until the axle speed differential decreases to the allowable value. The above-described operation occurs when any axle overspeeds beyond the allowable differential for the given locomotive speed. The only difference is that if any axle other than 38 overspeeds, the bias on the emitter 67b of transistor 67 does not increase.

It may be seen from the foregoing discussion that this adhesion loss control system of FIG. 1 does not positively decrease the axle slip differential to zero, but continuously regulates the differential to the permitted value. As a practical matter, it has been found that this regulation of wheel slip is all that is necessary to correct wheel slippage, inasmuch as the locomotive wheels when slipping within the allowed differential will cease to slip even at the allowed differential upon contacting a section of rail where the adhesion between wheel and rail increases. Application of sand to the rail before a wheel slipping at the allowed differential may sufficiently increase adhesion therebetween. For example, a locomotive pulling a heavy train may pass over a section of track having a thin oil film thereon which would cause one or more axles to slip. The adhesion loss control system will immediately regulate the excitation of the generator and the motor torque to reduce the slip to the allowable differential. Upon passing over the section of track having the oil thereon, the coefficient of friction between wheel and rail increases and the small allowed slip ceases.

As previously stated, my adhesion loss control system as thus far described does not positively decrease and hold the axle speed differential below the allowable value, and as a practical matter, such action is not deemed necessary. However, such positive control may be readily accomplished if desired by integrating the output of transistor 67 upon occurrence of a wheel slip and applying this integrated output to the magnetic amplifier control winding 18.

Integration of the output of transistor 67 may be accomplished with one of several known circuit arrangements. In FIG. 4, I show one such integrating arrangement to illustrate how an integrator may be incorporated in the output circuit of transistor 67. In FIG. 4, like-identifying numerals to those of FIG. 1 indicate like elements. Reference is now made to that figure wherein I show a resistor 91 connected across voltage source 68 to serve as a voltage divider. Point 92 of resistor 91 is connected to ground, and resistor 93 is connected between collector 67c of transistor 67 and ground. The collector 67c is also connected to the input 94 of a high-gain integrating amplifier 95 through resistor 96. A capacitance 95a is connected across the input and output of the amplifier 95, as is a diode 95b whose purpose is hereinafter explained. Input terminal 94 of amplifier 95 is also connected through resistor 97, to positive point 98 on voltage divider on resistor 91. The base-emitter circuit of transistor 67 is the same as that disclosed in conjunction with FIG. 1, as are the transducers 46 through 49 and speed bias network 69, all shown in block form inasmuch as they are described in detail in conjunction with FIG. 1, and the comparison circuit 63.

In describing the operation of the integrating amplifier 95 in conjunction with detector circuit 66, the assumption is made that the sum of all currents into Node N, which is input terminal 94 of integrator 95, is zero. This assumption is justified by the very high gain of amplifier 95 (on the order of $10^7$). If a wheel should slip or slide at a speed above the allowed differential and transistor 67 becomes conductive, the collector 67c, which is connected to ground through resistor 93, becomes negative with respect to ground in a magnitude related to the severity of the wheel slip or slide. Let the potential at collector 67c be represented as $e_1$, and the potential at point 98 on resistor 91 be represented as $e_2$. Potential $e_2$ is positive and at a fixed value.

When $e_1$ is at ground potential, i.e., no wheel slip or slide, there is no current $i_1$ equal to $e_1/R_{96}$ where $R_{96}$ is the resistance value of resistor 96. Current $i_2$ into Node N is equal to $e_2/R_{97}$ where $R_{97}$ is the resistance value of resistor 97. Therefore, $i_3$ through diode 95b equals $i_2$, and $e_0$, the output potential of integrator 95, will be at a voltage to ground equal to the voltage drop across diode 95b, which for practical purposes is zero.

Now, if an adhesion loss signal is applied to the base 67a of transistor 67, a voltage $e_1$ related to the severity of the wheel slip or slide results at collector 67c. A current $i_1$ then flows to collector 67c through resistor 96 such that $$i_1 = \frac{e_1}{R_{96}}$$

If $i_1$ exceeds $i_2$, then a current $i_4$ must flow into Node N such that $i_4 = i_1 - i_2$, and since $i_3$ must be zero due to the blocking action of diode 95b, $$e_0 = \frac{1}{C}\int i_4 dt = \frac{1}{C}\int (i_1 - i_2) dt$$

where C is the capacitance of capacitor 95a. This shows that $e_0$ rises in value with respect to ground as a function of time, and in turn produces a current in control winding 18 which results in a decrease in torque of the traction motors.

When the loss of adhesion is corrected, $e_1$ and hence $i_1$ become zero, the direction of $i_4$ reverses since $i_4 = i_1 - i_2$, and $e_0$ decreases as a function of time until it attempts to go negative with respect to ground, at which point $i_3$ is established in diode 95b to clamp $e_0$ at ground.

The integrator is described for purposes of illustration and orientation only, inasmuch as other suitable means for integrating the output of transistor 67 will be apparent to those skilled in the art.

In FIG. 5 I illustrate graphically the increase and decrease of current in control winding 18 with respect to time when an integrator is incorporated in the detector circuit 66. Time $t_1$ is representative of the time at which loss of adhesion is detected. At time $t_2$ the control current in winding 18 has increased to the point where the torque of the motors has been decreased to correct the loss of adhesion. At time $t_2$ the current in control winding 18 starts to decrease to increase the torque of the traction motors. The intervals between times $t_1$, $t_2$ and $t_3$ are of course determined by the time constants of the integrator, as well as the magnitude of the voltage $e_1$.

Figure 6:
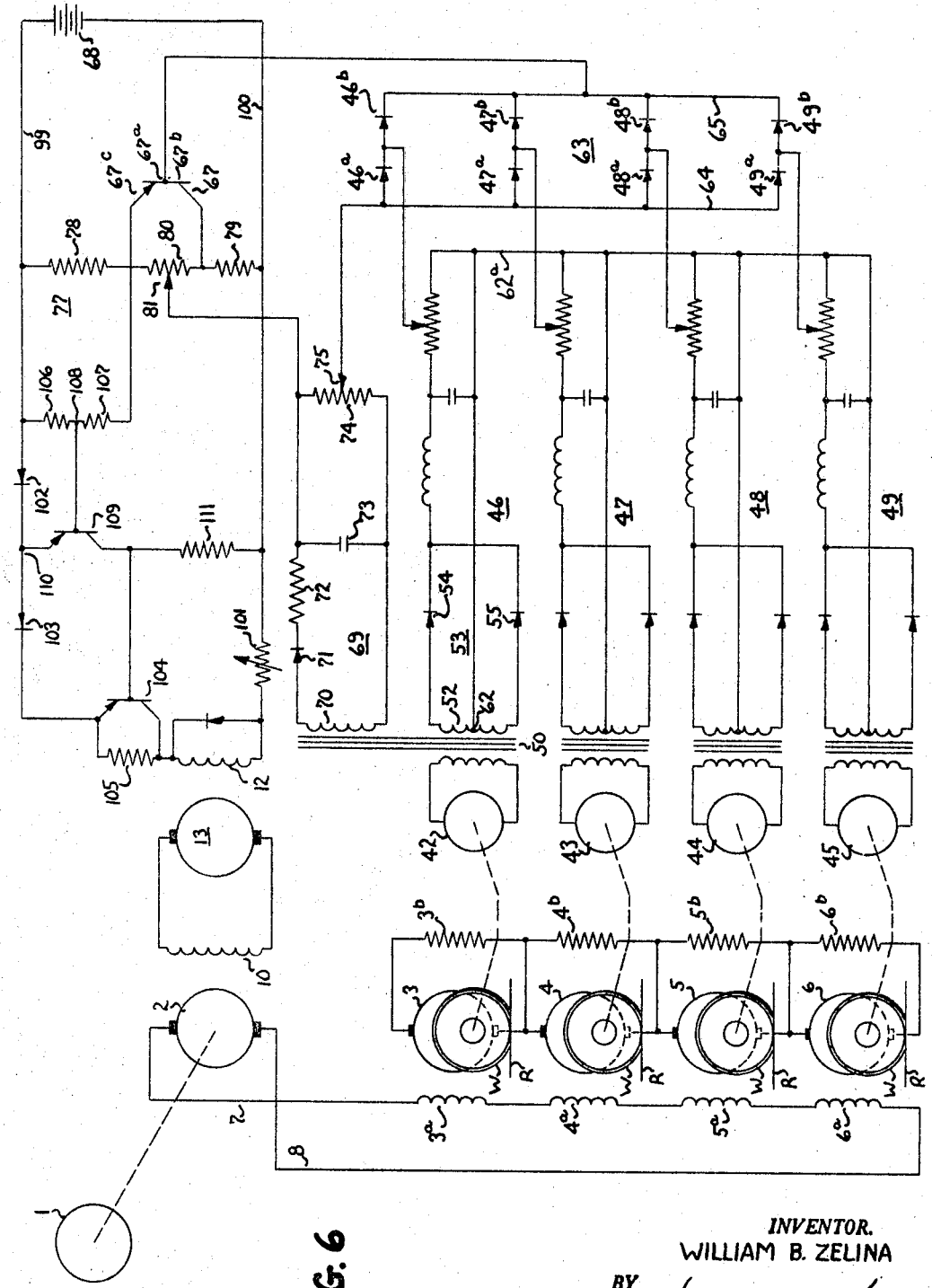
FIG. 6 illustrates a schematic circuit diagram of another embodiment of the present invention.

Reference is now made to FIG. 6 wherein I show an adhesion loss control system with the motors separately excited by the generator 2 in an arrangement for dynamic braking. Like numerals to those of FIG. 1 indicate like elements. To illustrate the versatility of my adhesion loss control system, I show, in FIG. 6, a different arrangement for controlling the excitation of the exciter generator 13 than is shown in FIG. 1.

The exciter generator field winding 12 is connected across lines 99 and 100, which are connected to the power source 68. Included in line 100 is an engineman's excitation control rheostat 101. The field winding 12 is normally excited by current flow from the positive terminal of power source 68, through line 99, rectifiers 102, 103, through the emitter-collector circuit of PNP transistor 104, field winding 12, rheostat 101 and return to the negative terminal of source 68 through line 100. A resistance 105 is connected across the emitter and collector of transistor 104 to provide a current path to field winding 12 should transistor 104 be rendered non-conductive. The value of the resistance 105 determines the minimum excitation of exciter generator 13, and hence traction generator 2.

It will be noted that in the adhesion loss detection system of FIG. 6, the motors fields 3a, 4a, 5a and 6a of the motors 3, 4, 5 and 6 are connected in a loop circuit with generator 2 and dynamic braking resistors 3b, 4b, 5b and 6b are connected across the armature terminals of the motors. In this arrangement the traction motors are excited as generators and driven by the axles during dynamic braking of the locomotive. The torque of the motors driven as generators retards rotation of the axles and the wheels thereon to brake the locomotive. If the locomotive while being dynamically braked should encounter a section of rail where the adhesion between the rail and wheel is insufficient to provide rolling contact of the wheel and rail for the braking torque a motor exerts on an axle, the wheels of that axle will begin to slide. When the allowable axle speed differential between any of the axles is exceeded, the transducers and voltage comparison network operate to turn on transistor 67, as previously described in conjunction with FIG. 1. The connections of the emitter 67b to voltage divider 77 is the same as in FIG. 1, as is the application of the differential-setting voltage to potentiometer 80. When a wheel slide above the allowable value occurs, the base-emitter circuit of transistor 67 becomes conductive causing current to flow from source 68 through line 99 and resistors 106 and 107, through the collector-emitter circuit of transistor 67 to the negative terminal of source 68. When the collector-emitter circuit of transistor 67 commences to conduct, the potential at point 108 between resistors 106 and 107 decreases by the voltage drop across resistor 106, which turns PNP transistor 109 on, establishing a current path from source 68 over line 99, point 110, the emitter-collector circuit of transistor 109, resistor 111 and return over line 100 to negative terminal of source 68. When conduction through this circuit path occurs, the base of transistor 104 moves toward the potential of point 110, thereby driving the base of transistor 104 in a positive direction with respect to the emitter which tends to decrease the conductivity of transistor 104. This decreases the current through field winding 12 of exciter generator 13, the excitation of traction generator 2, the field current in traction motor fields 3a, 4a, 5a and 6a which decreases the braking torque of the motors to correct sliding of the wheels on the overly-braked axle. The resulting change in speed of this axle is transmitted through the voltage comparison network as previously described, and the transistor 67 becomes less conductive as the wheel slide is regulated. As transistor 67 becomes less conductive, the potential at point 108 rises, decreasing the conductivity of transistor 109 which in turn decreases the potential at the base of transistor 104 with respect to the emitter of transistor 104, allowing transistor 104 to conduct more current to the field winding 12, and hence increase the excitation of the traction motor fields. Diode 102 is placed in the emitter-base circuit of transistor 109 to maintain the base sufficiently positive with respect to the emitter to prevent transistor 109 from conducting in the absence of an adhesion loss signal. Diode 103 provides a source of turn-off bias for transistor 104 when transistor 109 becomes conductive.

The operation of the adhesion loss control system in FIG. 6 is self-regulating in the same manner as the system illustrated in FIG. 1, and as explained in the description of that system.

If desired, an integrating network may be incorporated in the system disclosed in FIG. 6 in a similar manner to that shown for the system of FIG. 1 in FIG. 4. The use of the integration network will positively reduce any differentials in axle speed to the allowable differential determined by a predetermined allowable slip speed at locomotive standstill and locomotive speed. The system without the integrator will continuously regulate any slip or slide to the allowable differential.

As shown in the foregoing description the system is rendered operative whenever any unbalance condition exists between the transducer means associated with each of the motor-driven axles. Since this unbalance condition indicates a difference in rotational speed of one axle with respect to another the system provides detection and correction therefor. The system so far described, however, does not provide detection or correction for the condition when all wheels are slipping at the same speed, referred to hereinbefore as the "synchronous slip" condition.

Since damage can occur to wheels, rails and traction motors from such a synchronous slip condition it is often desirable to provide for the detection and correction thereof. In accord with another aspect of this invention the system of this invention may provide for overspeed and synchronous slip detection and correction by the incorporation therein of suitable means for detecting a predetermined maximum rotational speed of any axle and utilizing the detection of this condition to render the system operative.

Figure 7:
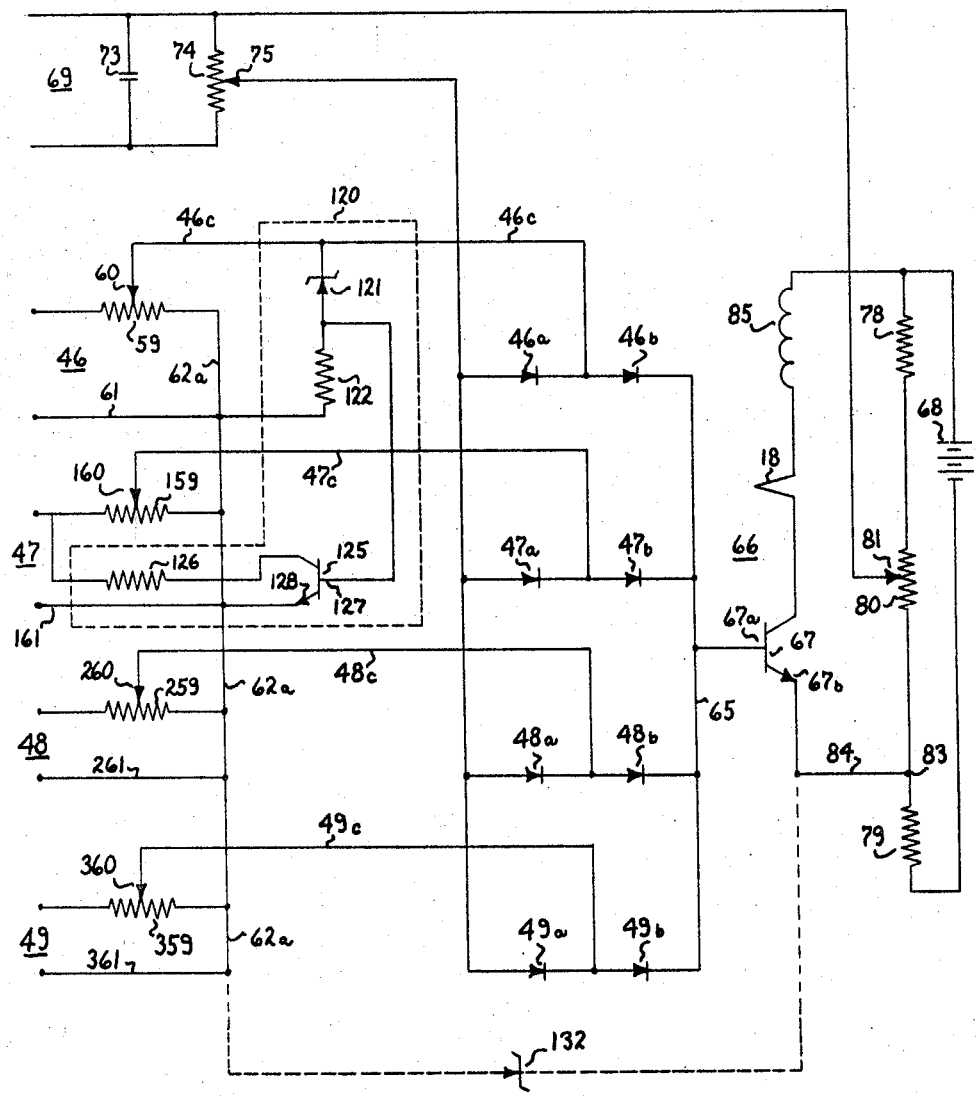
FIG. 7 is a partial schematic circuit diagram of one embodiment of this invention showing the incorporation therein of means for detecting a predetermined maximum rotational wheel speed.

In FIG. 7 there is shown a portion of the circuit of FIG. 1 illustrating the incorporation of one means for detecting the maximum rotational speed of an axle so that the system provides detection and correction for the synchronous slip as well as the vehicle overspeed condition. In accord with this aspect of the invention means are provided to establish a current path in response to the detection of the predetermined maximum rotational axle speed. This current path may be employed to directly render transistor 67 conductive or it may be employed to induce an artificial slip condition by causing an unbalance in the transducer outputs even though all axles have the same relative rotational speeds. This induced unbalance condition is operative to render transistor 67 conductive in the same manner as an unbalance produced by a true difference in rotational speed of one axle with respect to another. The latter method utilizing an "artificial unbalance" is preferred since the effect of the sensitivity and slope adjustments described hereinbefore on the axle speed level is maintained.

One circuit for detecting the predetermined maximum rotational axle speed is shown within the dash outline 120 in FIG. 7. As shown, a voltage reference device, such as is provided by Zener diode device 121, is connected in series with a resistance 122 between conductor 46c and the common conductor 62a. When the predetermined maximum rotational speed of the axle 38 is exceeded the output signal of transducer 46 exceeds the breakdown voltage of Zener diode 121 and a current path is established from conductor 46c to the common conductor 62a. This current path tends to hold the output of transducer 46 constant at the voltage corresponding to that produced at the predetermined maximum rotational speed of the axle with which it is associated. Since all the other axles are operating at the same speed, assuming a synchronous slip or an overspeed condition, the output of the other transducer circuits 47, 48 and 49 increase and thereby cause an unbalance condition. The operation thereafter is the same as that described fully hereinbefore when an unbalance is caused by an actual difference in rotational wheel speed. Thus, since the operation is the same, even though artifically induced, the sensitivity and slope adjustments have an effect on the wheel speed level at which the system operates.

More specifically, at the predetermined maximum rotational speed of axle 38 the voltage of transducer 46 from conductor 46c to conductor 61 is greater than the breakdown voltage of Zener diode 121. The current path established through Zener diode 121 and resistance 122 holds the output of transducer 46 approximately constant even though wheel speed increases. With true synchronous slip or vehicle overspeed conditions, the output voltages of transducers 47, 48 and 49 continue to increase with increasing wheel speed and, therefore, become greater than the output of transducer 46. When this unbalance reaches a level determined by the sensitivity and slope adjustments, transistor 67 is rendered conductive.

When transistor 67 becomes conductive current is supplied by the parallel operation of transducers 47, 48 and 49. From transducer 47 the current path is over conductor 47c, through diode device 47b and to conductor 65. From transducer 48 the current path is over conductor 48c, through diode 48b and to conductor 65. Similarly, from the transducer 49 the current path is over conductor 49c, through diode 49b and to conductor 65.

From conductor 65 the current path is through the base to emitter of transistor 67, over conductor 84 to potentiometer 80 and over conductor 82 to potentiometer 74 and diode 46a. The current then returns to conductor 62a of the transducer circuits over conductor 46c and the parallel combination of potentiometer 59 and Zener diode 121 and resistance 122.

For better performance under certain slip conditions transistor 125 and resistance 126 may be provided. For example, if the vehicle is operating near geared speed, there is a possibility that the axle that supplies the transducer circuit with which the predetermined maximum rotational speed detecting means is associated would be the only axle that would experience a slip. In the specific arrangement shown in FIG. 7 this would be axle 38 associated with transducer 46. It will be understood, however, that the maximum speed detecting means may be associated with any transducer means and is illustrated with transducer 46 in this and the foregoing description for simplicity and consistency.

If only Zener diode device 121 and resistance 122 are employed this slip could go undetected because the output voltage of that transducer circuit, circuit 46 for example, could not increase sufficiently to produce a signal. To avoid this condition, therefore, and provide the required unbalance, transistor 125 and resistance 126 are utilized. The current through Zener diode 121 provides a voltage drop across resistance 122. When this voltage drop reaches a certain level current flows through transistor 125 from base 127 to emitter 128. Transistor 125 is, therefore, conductive and its location in the circuit causes a decrease in the output resistance of transducer 47 to decrease the output voltage thereof to a value less than that of all the other transducer circuit means. Resistance 126 provides a current limiting action for transistor 125. Since an unbalanced condition is again established, transistor 67 is rendered conductive in the same manner as before with current being supplied by transducer means 46, 48 and 49 and returned through transducer means 47.

The circuit means shown within the dash outline 120 may be omitted and replaced with a voltage reference means, shown in phantom as a Zener diode device 132 adapted for connection between the common conductor 62a and conductor 84, to provide a current path in response to the detection of the predetermined maximum rotational speed of any of the axles 38, 39, 40 or 41 which is operative to render transistor 67 conductive. This current path provides for directly rendering transistor 67 conductive without any unbalance condition being required. Transistor 67 will be rendered conductive when the axles exceed the predetermined maximum rotational speed, either as a result of synchronous slip or vehicle overspeed, as a result of the relative voltage levels of the output transducer circuit means and the breakdown voltage of the Zener diode device 132. Since this current path provides a direct means of rendering transistor 67 conductive the slope and sensitivity adjustments provided by potentiometers 74 and 80 are not operative to determine the wheel speed level at which the system operates. The use of the Zener diode device connected from the common conductor 62a to the conductor 84 enables the system to simply and inexpensively detect a synchronous slip condition in response to the detection of the predetermined maximum rotational speed of one or all axles.

For simplicity in explaining the operation of the system employing the Zener diode 132 as the overspeed detection means, assume initially that all axles have a speed in excess of the predetermined maximum value. Under such conditions the output voltages of transducer circuit means 46, 47, 48 and 49 are larger than that of Zener diode 132, the voltage drop of the base to emitter of transistor 67 and the voltage drop of the diodes 46b, 47b, 48b and 49b associated with the respective transducer circuits so that current flows through Zener diode 132 to render transistor 67 conductive.

Since the current paths for turning transistor 67 on are similar only the path with respect to transducer circuit 46 will be specifically traced. Current leaves circuit 46 through potentiometer 60 and flows over conductor 46c, through diode 46b and over conductor 65 into base 67a of transistor 67. From the emitter 67b of transistor 67 current flows over conductor 84, through Zener diode 132 and returns to the negative side of circuit 46 over conductors 62a and 61. The transistor 67 therefore is rendered conductive due to the relative voltage levels of the output of the transducer circuit means and the breakdown voltage of Zener diode 132. The outputs of the other transducer circuit means 47, 48, and 49 are in parallel with transducer circuit 46 between conductors 62a and 65.

A wheel slip-slide system constructed in accordance with the present invention has a very good speed of response in detecting wheel adhesion loss. Th response time should be low enough to prevent unnecessary action on minor self-correcting adhesion losses; but sufficiently fast to initiate corrective action before a slip or slide becomes serious enough to cause damage. This is particularly important in the prevention of rail damage as a result of low-speed slips. A system similar to that of FIG. 1 utilizing the alternator of my previously mentioned United States Patent No. 3,077,549 can detect slip differentials of peripheral wheel velocities of 5 miles per hour in 250 milliseconds. A proportionately shorter time is required to detect slips of greater magnitude.

The system which I have disclosed is economical with respect to the prior art systems, and the elements of the system, except the alternator, may all be accessibly mounted on small circuit boards or cards in a circuit package of the type disclosed in the copending application of Robert K. Allen, Serial No. 842,861 filed September 28, 1959, and assigned to the same assignee as the present invention. Moreover, it may be readily adapted for incorporation on existing diesel-electric locomotives with provision to control the generator excitation of the existing locomotives.

It will be noted in FIG. 1 that I have shown the traction motors connected for motoring operation with one excitation arrangement, and in FIG. 6 I have shown the traction motors connected for dynamic braking with a second excitation arrangement. However, it is to be understood that either excitation arrangement may be used in a locomotive wherein the traction generator is driven by a prime mover and incorporated in my adhesion loss detection and control system.

While I have mentioned that my adhesion loss detection and control system as incorporated in a control system of an internally powered locomotive, it could be adapted for incorporation in the control system of an externally powered, electrically-propelled locomotive.

In the discussion of the requirements of an acceptable wheel slip-slide detection system in conjunction with FIG. 3, I have mentioned specific values of allowable wheel slip at standstill, and allowable overspeeding of the traction motors, as well as describing the operation of my system in conjunction with a locomotive having the maximum variable tolerances in wheel diameters. There will, of course, be those who do not agree with the values I have set forth. For example, some railroads will not permit as much as a 2-inch variance in the driving wheels of a locomotive, and some will not agree with the 5 miles per hour figure as the allowable wheel slip at locomotive standstill, nor the 10% allowable overspeeding of the traction motors. However, in the rail adhesion loss detection and control system which I have disclosed, the allowable wheel slip at standstill as exemplified by point C in FIG. 3 may be set according to the desires and requirements of the user and the slope M on the line CD in FIG. 3 may be adjusted in accordance with the allowable overspeeding of a particular manufacturer's traction motor. The manner in which this invention provides for such adjustments has previously been explained.

In describing and illustrating my invention, I have principally referred to loss of adhesion during motoring operation and during dynamic braking. It is recognized also that an axle may become locked due to mechanical failure of a traction motor such as by a frozen bearing or rupture of traction motor armature coils. Such locking of an axle may occur during either motor operation or dynamic braking operation, and the resulting wheel slide will be detected during either condition of locomotive operation.

As will be apparent, the adhesion loss detection and control system herein disclosed does not differentiate between wheel slipping and wheel sliding, but is sensitive to any loss of adhesion beyond a predetermined differential. Also, while I have illustrated my invention as incorporated on a locomotive having four driving axles, it will be apparent that it is also applicable to a locomotive having any other number of driving axles, and the only modification that need be made to the disclosed embodiments of the invention is to provide an axle speed sensing means for each powered axle and an associated diode pair in the voltage comparison circuit.

Also, although it is one aspect of my invention in the interest of economy and simplicity that the speed reference biasing signal be derived from some existing axle speed indicating means, as exemplified by the speed biasing network, the invention also contemplates that such a biasing signal may be derived in other manners.

In illustrating and describing my invention, I have utilized a transistor 67 in the detection circuit 66, and have spoken of turning the transistor 67 ON and OFF upon detection and correction of a loss of wheel adhesion. However, it is to be understood that the transistor 67 is not operated as a switch, but operates as a Class A amplifier or variable impedance upon detection of loss of wheel adhesion, and therefore it is contemplated that other amplifying devices such as vacuum tubes or voltage impedances could be used in place of transistor 67 without departing from the scope of this invention.

While I have illustrated and described preferred embodiments of this invention and modifications thereto, further changes in the disclosed embodiments may occur to those skilled in the art without departing from the spirit and scope of this invention. Accordingly, it is my intention to cover all changes and modifications of the examples of the invention herein chosen for purposes of disclosure which do not constitute departures from the spirit and scope of the invention.

What is claimed as new and desired to secure by Letters Patent of the United States is:

1. A wheel adhesion loss detection and correction system for a locomotive having traction motors driveably connected to associated wheel and axle assemblies adapted to roll on rail, a generator for supplying electrical energy to the motors, excitation control means for said generator for regulating the electrical energy supplied by said generator to said motors to control the torque exerted on the wheel and axle assemblies by the associated motors, comprising means associated with and responsive to the speed of each motor-driven axle for providing a unidirectional signal proportional in magnitude to the speed of the associated axle, means for comparing the unidirectional signals to detect any differential in the magnitudes of the unidirectional signals and hence loss of adhesion between wheels and rail beyond a value determined by the operating speed of the locomotive, means for integrating with respect to time the detected differential signal to obtain a control signal varying at a linear rate dependent on the magnitude of the detected differential signal and means for applying the control signal to the excitation control means to reduce the torque exerted by the motors on the associated axles at a timed rate until the magnitude of the differential signal no longer exceeds said predetermined value.

2. For use with a locomotive having traction motors driveably connected to associated wheel and axle assemblies adapted to roll on rail, and having means for controlling the electrical power input to the motors from a source of electrical energy to control the torque exerted on the wheel and axle assemblies by the associated motors: a wheel adhesion loss correction system comprising, means associated with and responsive to the speed of each motor-driven axle for providing a unidirectional signal proportional to the speed of the associated axle, means to detect any differential in the magnitudes of the unidirectional signals beyond a value determined by a selected allowable wheel slip speed at locomotive standstill and the operating speed of the locomotive, and electric timing means electrically responsive to a detected differential signal to cause the means for controlling the electrical power input to the traction motor to reduce the electric power input to the traction motors at a timed rate until the magnitude of the differential signal no longer exceeds said determined value.

3. A wheel adhesion loss detection and correction system for a locomotive having traction motors drivably connected to associated wheel and axle assemblies adapted to roll on rail, a generator for supplying electrical energy to said traction motors, said motors being operable to exert either driving or braking torques on the associated wheel and axle assemblies, means for controlling the excitation of said generator to control the electrical energy supplied to said motors and therefore the torque exerted by said motors on the associated wheel and axle assemblies comprising: an alternator driveably connected to each of the powered axles, said alternator being effective to furnish an output signal having a frequency proportional to its driven speed; means associated with each alternator for deriving a unidirectional signal whose magnitude is proportional to the frequency of the alternator signal, said associated means comprising a transformer having a generally rectangular hysteresis characteristic designed to be driven between positive and negative saturation by the alternator output, the primary of each of said transformers being connected to receive the output of its associated alternator, the secondary of each transformer being applied to a rectifying network; a comparison network for comparing the magnitudes of the unidirectional signals and yielding an output signal indicative of the difference in magnitude between any of the unidirectional signals; an amplifying device having a control electrode and at least two other electrodes; means to derive a reference signal having a magnitude dependent on a selected allowable wheel slip speed at locomotive standstill and the operating speed of the locomotive; the output of said comparison network being applied to said control electrode and said reference signal being applied to a second of said electrodes, the reference signal normally biasing said amplifying device off, an output signal appearing at the third electrode of said amplifying device when the magnitude of the output signal of said comparison network is of sufficient magnitude to render said amplifying device operative; means for applying an output signal of said amplifying device to the generator excitation control means; the output signal of said amplifying device being effective to regulate the excitation of said generator and therefore the torque of said traction motors until the signal applied to said control electrode is of insufficient magnitude to overcome the bias on said second electrode.

4. A wheel adhesion loss detection and correction system for a locomotive having traction motors drivably connected to associated wheel and axle assemblies adapted to roll on rail, a generator for supplying electrical energy to said traction motors, said motors being operable to exert either driving or braking torques on the associated wheel and axle assemblies, means for controlling the excitation of said generator to control the electrical energy supplied to said motors and therefore the torque exerted by said motors on the associated wheel and axle asemblies, comprising: an alternator driveably connected to each of the power axles, said alternator being effective to furnish an output signal having a frequency proportional to its driven speed; means associated with each alternator for deriving a unidirectional signal whose magnitude is proportional to the frequency of the alternator signal, said associated means comprising a transformer having a generally rectangular hysteresis characteristic designed to be driven between positive and negative saturation by the alternator output, the primary of each of said transformers being connected to receive the output of its associated alternator, the secondary of each transformer being applied to a rectifying network; a comparison network for comparing the magnitudes of the unidirectional signals and yielding an output signal indicative of the difference in magnitude between any of the unidirectional signals; an amplifying device having a control electrode and at least two other electrodes, means to derive a reference signal having a magnitude dependent on a selected allowable wheel slip speed at locomotive standstill and the operating speed of the locomotive; the output of said comparison network being applied to said control electrode and said reference signal being applied to a second of said electrodes, the reference signal normally biasing said amplifying device off, an output signal appearing at the third electrode of said amplifying device when the magnitude of the output signal of said comparison network is of sufficient magnitude to render said amplifying device operative; means to integrate with respect to time the output signal of said amplifying device and apply the integrated signal to the generator excitation control means, the integrated output of said amplifying device being effective to modify the excitation of said generator and therefore the torque of said traction motors at a timed-rate until the signal applied to said control electrode is of insufficient magnitude to overcome the bias on said second electrode.

5. In a locomotive wheel adhesion loss detection system wherein axle-driven alternators driveably connected to motorized axles furnish an output signal having a frequency proportional to the driven speed of the alternator, the outputs of each of the alternators being converted to unidirectional signals proportional to the driven speed of the alternator; comparison means for comparing the unidirectional signals and furnishing an output signal indicative of the differential magnitude of the signals, a detector having a control electrode and a second electrode, the output of said comparison means being applied to said control electrode, conversion means associated with each of said alternators for producing a unidirectional signal proportional to the frequency of the output of the alternator comprising a transformer having a generally rectangular hysteresis characteristic core designed to be driven between positive and negative saturation by the alternator output, the primary winding of said transformer being connected to receive the output of said alternator, the secondary winding of said transformer being connected through rectifying and wave-smoothing means to said comparison means, another winding on one of said transformers, rectifying and wave-smoothing means connected to said other winding to provide a reference network yielding a signal output proportional to the speed of the one axle, the output of the reference network being applied to the second electrode of said detector to establish a bias thereon to maintain the detector means inoperative in the absence of a signal on said control electrode of sufficient magnitude to overcome bias on said second electrode.

6. An electrical propulsion system for a vehicle having traction motors driveably connected to associated wheel and axle assemblies, comprising: means for supplying electrical energy to said traction motors, said motors being operable to exert either driving or braking torques on the associated wheel and axle assemblies; means for controlling said means for supplying to thereby regulate the electrical energy supplied to said motors and therefore the torque exerted by said motors on the associated wheel and axle assemblies; a generator means associated with and responsive to the speed of each of the powered axles for providing a unidirectional signal proportional in magnitude to the speed of the associated axle; a comparison network for comparing the magnitudes of the unidirectional signals and yielding an output signal indicative of the difference in magnitude of any of the unidirectional signals whereby the differential signal is indicative of axle speed differential; an amplifying device having a control electrode and at least two other electrodes; means to derive a reference signal having a rate of increase with vehicle speed dependent on a selected allowable wheel slip speed at vehicle standstill and the operating speed of the vehicle; the output of said comparison network being applied to said control electrode, the reference signal being applied one of said other electrodes and normally biasing said amplifying device inoperative, an output signal proportional to the differential in axle speeds above a predetermined allowable differential appearing at the second of said other electrodes of said amplifying device when the magnitude of the output signal of said comparison network is of sufficient magnitude to render said amplifying device operative; and means for applying the output of said amplifying device to said means for controlling to regulate the electrical energy supplied said motors as a function of the magnitude of the amplifying device output signal to thereby regulate the torque of said motors until said amplifier is rendered inoperative.

7. The combination with a vehicle propulsion system comprising:
  (a) means associated with each of the power driven axles of said vehicle for developing a unidirectional signal having a magnitude proportional to the rotational speed of the associated axle;
  (b) a comparison network for comparing the magnitudes of said unidirectional signals and providing an output signal indicative of axle speed differential;
  (c) an amplifying device;
  (d) means applying the output signal of said comparison network to said amplifying device to provide forward bias therefor;
  (e) means for deriving a signal having a rate of increase with vehicle speed dependent on a selected allowable axle speed differential at vehicle standstill and the operating speed thereof;
  (f) means applying said last-named signal to said amplifying device operative to provide a reverse bias therefor so that the conductivity of said amplifying device depends upon the magnitude of the output signal of said comparison network beyond an allowable level;
  (g) means responsive to the output of said amplifying device for controlling the power supplied to said power driven axles;
  (h) and additional means responsive to the detection of a predetermined maximum rotational speed of any power driven axle operative to render said amplifying device conductive.

8. The system of claim 7 wherein said additional means is a voltage reference device arranged to establish a current path energizing said amplifying device when the magnitude of any of said unidirectional signals exceeds the voltage reference level of said device.

9. The system of claim 8 wherein said voltage reference device is a Zener diode-type device providing a current path to energize said amplifying device when the magnitude of any of said unidirectional signals is sufficient to cause the breakdown voltage of said Zener diode-type device to be exceeded.

10. The system of claim 7 wherein said additional means comprises means for creating a differential in the magnitudes of said unidirectional signals when a predetermined maximum rotational speed of an axle is exceeded.

11. The system of claim 10 wherein said means for creating said differential in the magnitudes of said unidirectional signals includes a Zener diode-type device associated with one of said means for developing said unidirectional signals and arranged to provide a current path operative to maintain the magnitude of the unidirectional signal thereof at a level determined by the breakdown voltage of said Zener diode-type device and corresponding to a predetermined maximum rotational speed of the axle associated therewith.

References Cited by the Examiner
UNITED STATES PATENTS

| | | | |
|---|---|---|---|
| 2,407,521 | 9/46 | Palley | 318—52 X |
| 2,626,362 | 1/53 | Johansson | 318—52 X |
| 2,652,555 | 9/53 | Smith | 318—52 X |
| 2,735,090 | 2/56 | Maenpaa | 318—52 X |
| 2,886,763 | 5/59 | Zelina | 322—25 |
| 2,959,772 | 11/60 | Bruner. | |
| 3,060,602 | 10/62 | Buttenhoff | 180—77 X |
| 3,064,371 | 11/62 | Kutzler | 180—77 X |
| 3,089,991 | 5/63 | Stamm | 318—158 X |
| 3,117,264 | 1/64 | Smith | 318—52 |

ORIS L. RADER, *Primary Examiner.*